June 29, 1926.

F. L. ALBEN 1,590,403

SIDE EQUALIZED TRUCK

Filed Jan. 23, 1923

WITNESSES:
P. H. Crock.
W. B. Jaspert.

INVENTOR
Frank L. Alben.
BY
Wesley G. Carr
ATTORNEY

June 29, 1926. 1,590,403
F. L. ALBEN
SIDE EQUALIZED TRUCK
Filed Jan. 23, 1923 3 Sheets-Sheet 3
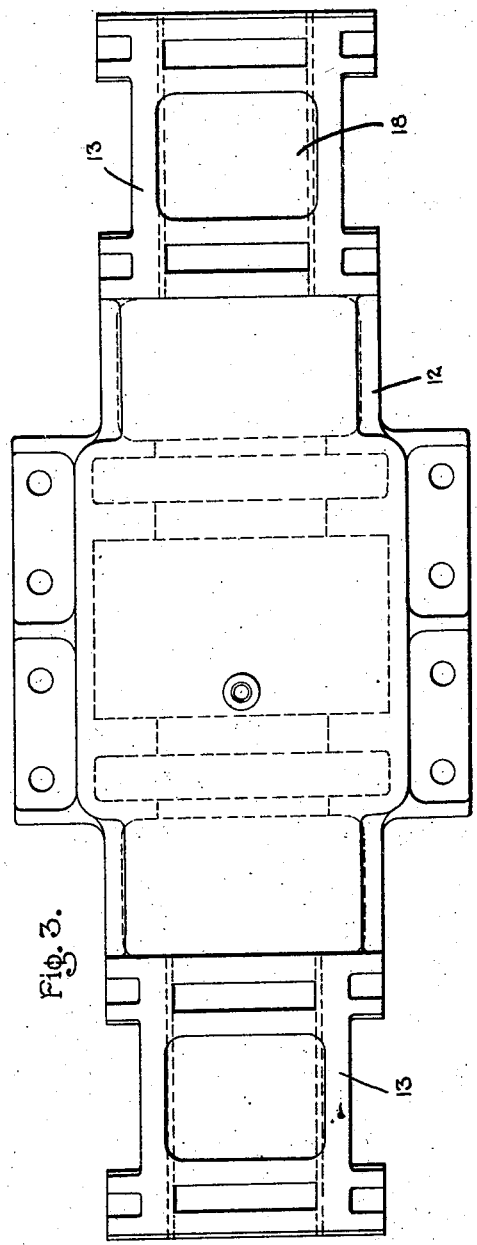
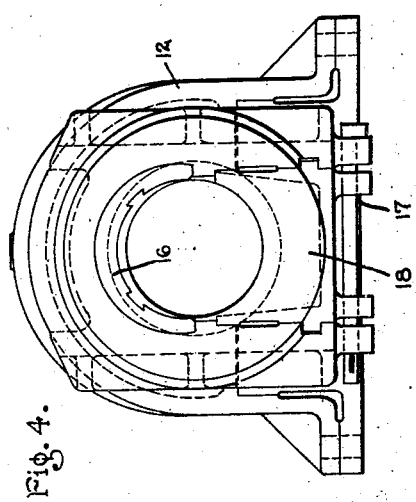
WITNESSES:
INVENTOR
Frank L. Alben.
BY
ATTORNEY Patented June 29, 1926.

1,590,403

UNITED STATES PATENT OFFICE.

FRANK L. ALBEN, OF WILKINSBURG, PENNSYLVANIA, ASSIGNOR TO WESTINGHOUSE ELECTRIC & MANUFACTURING COMPANY, A CORPORATION OF PENNSYLVANIA.

SIDE EQUALIZED TRUCK.

Application filed January 23, 1923. Serial No. 614,367.

My invention relates to radial or guiding trucks for electric locomotives of the type employed to effect the guiding and centering of the main frame relative to the locomotive cab or body portion, and more especially to such guiding trucks in combination with a side equalizer system to obtain side stabilty.

It is among the objects of my invention to provide an equalized and guiding mechanism for railway vehicles which shall be of simple mechanical construction, which shall be readily accessible to all its parts, and which shall be mechanically durable and efficient in its several operating functions.

It is a further object of this invention to provide a two-point equalization system in a locomotive unit so that rolling or nosing of the locomotive cab will be prevented to obtain lateral or side stability.

To provide stability of the cab and obtain proper steering or guiding on the rails, I provide a guiding truck which is loaded from a side equalization system and which has improved features which combine the proper functions of guiding the locomotive, stabilizing the cab and providing freedom of movement of the center pin connection to the locomotive frame.

In the accompanying drawings, constituting a part hereof and in which like reference characters designate like parts, Fig. 1 is a side elevational view of a fragmentary portion of one unit of a locomotive frame, having a radial truck secured at one end thereof and provided with an equalization system in accordance with the principle of my invention.

Fig. 3 is a plan view of a unitary journal box structure embodied in the guiding truck, Fig. 2 and Fig. 4 is an end elevational view of the journal box, Fig. 3.

Figure 1:
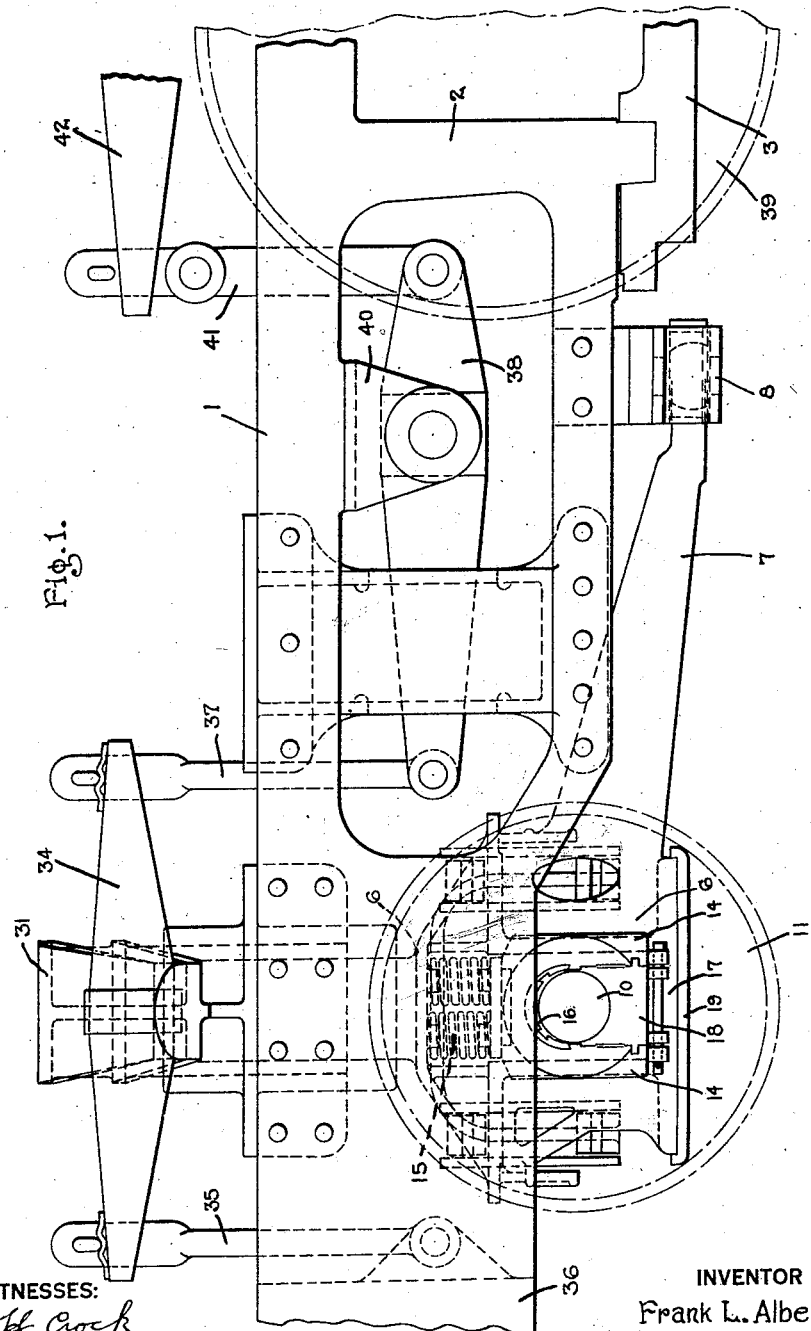
Figure 2:
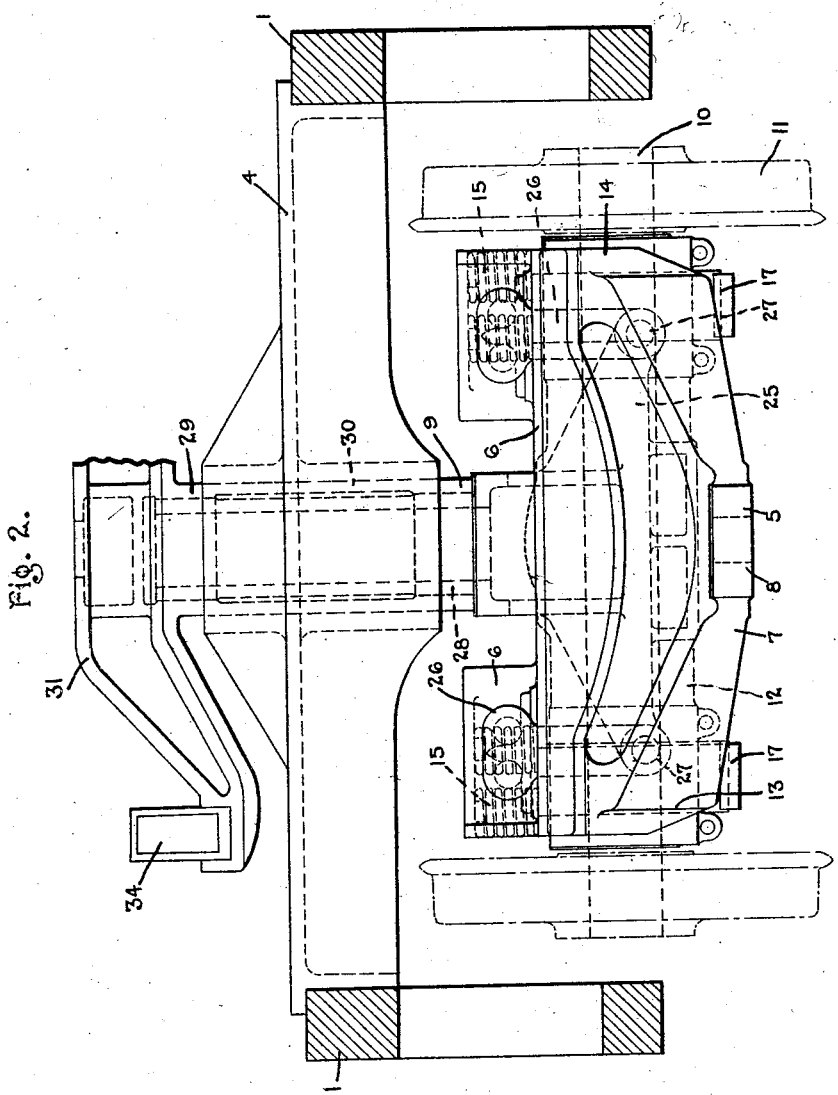
Fig. 2 is a rear elevation of the guiding truck and locomotive frame illustrating the center pin connection therebetween.

Referring to Fig. 1, the device consists of a locomotive frame construction comprising a pair of side frames 1 provided with the usual pedestal jaws 2 having a longitudinal pedestal binder 3 secured thereto in the usual manner. The frames are supported on the wheel axles by journal boxes (not shown) and are strengthened or reinforced by a plurality of tie rods or bolsters 4. A guiding truck 5 comprising an integral frame and radius bar portion 6 and 7, respectively, is connected to the main frame by a ball joint 8 and a center pin 9 to provide relative movement therebetween.

The truck 5 is supported on an axle 10 having flanged wheels 11 mounted thereon and is secured thereto by an integral journal box 12, Figs. 3 and 4. The box 12 is provided with recesses 13 which receive the pedestal jaws 14 of the truck frame the box being vertically movable therein and secured by a pedestal binder 19. A plurality of helical springs 15 are interposed between the top of the box 12 and the truck frame 6 through which the loading of the axle 10 is effected. The box 12 is provided with the usual bearing brasses 16 which rest upon the axle 10 and a removable base 17 at its respective ends to provide access to the grease cellar 18. A thrust bearing, (not shown) is provided in the box 12 and co-operating thrust collars (not shown) are provided on the axle 10 to engage said box bearings.

The center pin 9 is provided with a base 25 pivotally secured to a plurality of heart links 26 at its projected ends 27 by which it is suspended from the frame 6 of the guiding truck 5. A cylindrical body portion 28, formed integrally with the base 25, extends vertically upward thereon and is adapted to pivot in a sleeve member 29 which is pivotally mounted in the cylindrical opening 30 of the bolster 4 of the locomotive frame.

The sleeve 29 is integral with, and supports, a cross beam 31 which is adapted to support a pair of leaf springs 34 comprising a part of a side equalization system.

The springs 34, Fig. 1, are connected by links 35 to the bumper frame 36 on one end and by similar links 37 to an equalizer arm 38 which is so proportioned as to provide proper load distribution between the truck and the drive axle of the wheel 39. The equalizer 38 is secured to the main frame 1 by a bracket 40 and is connected by a link 41 to a drive spring 42 which rests upon a drive box (not shown) fitted between the pedestals 2. The drive springs 42 are interconnected in the usual manner to distribute the load on the respective drive axles.

This system of side equalization and loading of the truck provides a two-point suspension and functions to give lateral stability to the locomotive frame. The crossbeam 31 yieldingly supported by the center pin 9 effects proper loading of the truck. The unitary box construction is an efficient design for guide trucks which permits taking up the lateral thrust of the idle wheel axle and provides an enclosed housing for the thrust and crown bearings.

The design of the center pin mounting between the radial truck 5, the main truck 1 and the equalizer beam 31, and the pivotal connection of the center pin base 25 to the heart links 26 provides relative pivotal, lateral, and vertical movements of the respective members, thus establishing a balance of loading and stressing thereof.

It will be readily understood from the above description of my invention that a locomotive guiding and weight-equalizing mechanism formed in accordance therewith provides a mechanically durable and efficient structure, which is a decided improvement over the prior art. The design lends itself readily to a durable construction to adequately withstand the operating conditions to which it is subjected. To this end the usual type of elliptical spring support for the center pin base has been omitted and a solid base provided in its place, the resiliency essential in such prior structures is provided by the helical coil springs which eliminates the lateral thrust previously transmitted through the supporting spring structure.

Although I have described a specific embodiment of my invention, it will be obvious to those skilled in the art that various modifications may be made in the details of construction without departing from the principles herein set forth. For instance, the general design of the radial truck, center pin and driving truck may be such as to adapt them to the particular service requirements in which they will be employed. The device for suspending the center pin from the radial truck bolster may be altered and generally the structural details of the various operating parts may be varied to accomplish the function herein described.

I claim as my invention:

1. The combination with a railway vehicle frame, of a radial truck having a center pin connection with said vehicle, and a side equalizer system connected to the respective ends of a cross beam comprising a part of said center pin.

2. The combination with a railway vehicle frame, of a radial truck having a center pin connection with said vehicle, and a side equalizer system connected to the respective ends of a cross beam comprising a part of said center pin and means for effecting lateral stability of said vehicle and truck.

3. The combination with a railway vehicle frame, of a radial truck having a center pin connection with said vehicle, and a side equalizer system connected to the respective ends of a cross beam comprising a part of said center pin and means for effecting lateral stability of said vehicle and truck, said stabilizing means comprising an integral journal box for said truck axle having a plurality of thrust bearings engaging said axle and a swing link connection of the center pin and truck frame.

4. The combination with a railway vehicle frame of a radial truck comprising an integral truck frame and radius bar body portion, a journal box vertically movable in said frame and journalled to a wheeled axle, a plurality of resilient members interposed between said frame and box, a center pin mounting for said radial truck comprising a base pivotally secured to a plurality of cam links suspended from the truck frame bolster having a cylindrical body portion extending vertically upward thereon, a laterally disposed equalizer beam adapted to support a side equalizer spring on its respective ends, and a sleeve portion on said equalizer beam pivotally mounted in the transverse center plate of the main truck and adapted to receive the center pin of said radial truck.

5. The combination with a railway vehicle frame of a radial truck comprising an integral truck frame and radius bar body portion, a plurality of journal boxes vertically movable in said frame and journalled to a wheeled axle, a plurality of helical coil springs interposed between said frame and boxes, a center pin mounting for said radial truck comprising a base pivotally secured to a plurality of heart links suspended from the truck frame bolster, having a cylindrical body portion extending vertically upward thereon, a laterally disposed equalizer beam adapted to support a side equalizer spring on its respective ends, an integral sleeve portion on said equalizer beam pivotally mounted in the transverse center plate of the main truck and adapted to receive the center pin of said radial truck.

6. The combination with a railway vehicle frame drive trucks, of a radial truck comprising an integral truck frame and radius bar body portion, a journal box vertically movable in said frame and journalled to a wheeled axle, a plurality of resilient members interposed between said frame and box, a center pin comprising a base, having a cylindrical body portion extending thereon suspended by a plurality of heart links from the radial truck bolster, an equalizer beam pivotally mounted in a center plate of the main truck having a sleeve portion adapted to receive said cylindrical center pin to provide relative pivotal and vertical movement of said radial and main trucks and equalizer beam, and means on said beam for supporting a pair of drive springs of the main trucks side equalizer system to provide a two-point suspension thereof.

In testimony whereof, I have hereunto subscribed my name this 16th day of January, 1923.

FRANK L. ALBEN.